United States Patent
Yang et al.

(10) Patent No.: US 11,469,837 B2
(45) Date of Patent: Oct. 11, 2022

(54) SIDELINK COMMUNICATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jongkeun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/720,131

(22) Filed: Apr. 13, 2022

(65) Prior Publication Data
US 2022/0255644 A1 Aug. 11, 2022

Related U.S. Application Data

(63) Continuation of application No. PCT/KR2021/004042, filed on Apr. 1, 2021.

(30) Foreign Application Priority Data

Apr. 6, 2020 (KR) .......................... 10-2020-0041451

(51) Int. Cl.
*H04B 17/318* (2015.01)
*H04W 72/04* (2009.01)
*H04L 27/26* (2006.01)
*H04L 5/00* (2006.01)
(Continued)

(52) U.S. Cl.
CPC ......... *H04B 17/318* (2015.01); *H04L 5/0094* (2013.01); *H04L 27/26025* (2021.01); *H04W 24/10* (2013.01); *H04W 72/0406* (2013.01); *H04W 4/40* (2018.02)

(58) Field of Classification Search
CPC ..... H04B 17/318; H04L 5/003; H04L 5/0094; H04L 27/2602; H04L 27/26025; H04L 43/06; H04W 4/40–48; H04W 8/005; H04W 8/20; H04W 24/02; H04W 24/10; H04W 36/00; H04W 36/0072; H04W 36/0083; H04W 36/0088; H04W 40/24; H04W 52/365; H04W 72/0406–0433; H04W 72/08
See application file for complete search history.

(56) References Cited

FOREIGN PATENT DOCUMENTS

CN 101588590 B * 4/2011
WO 2017/176098 A1 10/2017

OTHER PUBLICATIONS

Huawei et al., "Discussion on measurement remaining issues for NR V2X", R4-2001577, 3GPP TSG-RAN WG4 Meeting #94-e, Online, Feb. 24-Mar. 6, 2020, see pp. 1-2.

(Continued)

*Primary Examiner* — Thomas R Cairns
(74) *Attorney, Agent, or Firm* — Dentons US LLP

(57) ABSTRACT

One disclosure of the present specification provides a UE performing sidelink communication. The UE may include: at least one transceiver; at least one processor; and at least one memory that stores instructions and is operably electrically connectable with the at least one processor. An operation performed on the basis of an instruction executed by the at least one processor may include the steps of: receiving, via a PSSCH or a PSCCH, a DMRS from another UE; and measuring an RSRP of the DMRS on the basis of RSRP measurement requirements.

12 Claims, 13 Drawing Sheets

(51) Int. Cl.
*H04W 24/10* (2009.01)
*H04W 4/40* (2018.01)

(56) References Cited

OTHER PUBLICATIONS

Ericsson, "Simulation results for UE relay selection and reselection", R4-156312, 3GPP TSG-RAN WG4 Meeting #76bis, Sophia Antipolis, France, Oct. 12-16, 2015, see pp. 2-6; table 4; and figure 1.

Huawei et al., "Discussions on band grouping for performance requirements", R4-1804751, 3GPP TSG-RAN WG4 Meeting #86bis, Melbourne, Australia, Apr. 16-20, 2018, see pp. 2-5; and tables 3.5.1-1 and 5.3.2-1.

Moderator (LG Electronics), "Email discussion summary for RAN4#94e_#51_5G_V2X_NRSL_RRM_Part_1", R4-2002305, 3GPP TSG-RAN WG4 Meeting #94-e, Electronic Meeting, Feb. 24-Mar. 6, 2020, see pp. 9 and 21-22.

\* cited by examiner

FIG. 9

| Measurement Period = single shot | | SCS | | | | | | | | | | | | |
|---|---|---|---|---|---|---|---|---|---|---|---|---|---|---|
| | | 15kHZ | | | | 30kHZ | | | | 60kHZ | | | | |
| Propagation condition | SNR [dB] | 50% | 5% | 95% | BLER | 50% | 5% | 95% | BLER | 50% | 5% | 95% | BLER | |
| AWGN | -6 | 0.79 | -0.50 | 2.37 | 0.04 | 0.84 | -0.47 | 2.40 | 0.04 | 0.85 | -0.44 | 2.43 | 0.04 | |
| | -3 | 0.56 | -0.36 | 1.74 | 0.00 | 0.60 | -0.31 | 1.76 | 0.00 | 0.59 | -0.33 | 1.77 | 0.00 | |
| | 0 | 0.36 | -0.28 | 1.25 | 0.00 | 0.42 | -0.22 | 1.30 | 0.00 | 0.43 | -0.24 | 1.28 | 0.00 | |
| | 3 | 0.26 | -0.20 | 0.89 | 0.00 | 0.29 | -0.19 | 0.92 | 0.00 | 0.30 | -0.17 | 0.91 | 0.00 | |
| TDLC 100ns-300Hz | -6 | 0.27 | -1.29 | 2.33 | 0.39 | 0.36 | -1.20 | 2.49 | 0.41 | 0.49 | -1.14 | 2.77 | 0.50 | |
| | -3 | 0.14 | -1.04 | 1.60 | 0.15 | 0.20 | -0.98 | 1.76 | 0.16 | 0.26 | -0.95 | 1.97 | 0.24 | |
| | 0 | 0.08 | -0.79 | 1.13 | 0.05 | 0.14 | -0.70 | 1.22 | 0.05 | 0.14 | -0.76 | 1.33 | 0.08 | |
| | 3 | 0.04 | -0.63 | 0.76 | 0.01 | 0.09 | -0.57 | 0.87 | 0.02 | 0.12 | -0.51 | 0.98 | 0.02 | |
| TDLC 100ns-150Hz | -6 | 0.28 | -1.24 | 2.38 | 0.39 | 0.34 | -1.24 | 2.48 | 0.40 | 0.44 | -1.19 | 2.77 | 0.50 | |
| | -3 | 0.14 | -1.00 | 1.62 | 0.16 | 0.25 | -0.83 | 1.75 | 0.15 | 0.26 | -0.94 | 2.01 | 0.24 | |
| | 0 | 0.11 | -0.76 | 1.18 | 0.05 | 0.14 | -0.70 | 1.26 | 0.05 | 0.16 | -0.73 | 1.39 | 0.08 | |
| | 3 | 0.05 | -0.59 | 0.80 | 0.02 | 0.09 | -0.52 | 0.87 | 0.01 | 0.12 | -0.53 | 0.97 | 0.03 | |

FIG. 10

| Measurement Period= single shot | | SCS | | | | | | | | | |
|---|---|---|---|---|---|---|---|---|---|---|---|
| | | 15kHZ | | | 30kHZ | | | 60kHZ | | |
| Propagation condition | SNR [dB] | 50% | 5% | 95% | 50% | 5% | 95% | 50% | 5% | 95% |
| AWGN | -6 | 0.95 | -0.52 | 2.71 | 0.96 | -0.52 | 2.75 | 0.97 | -0.51 | 2.72 |
| | -3 | 0.69 | -0.41 | 2.01 | 0.66 | -0.41 | 1.99 | 0.68 | -0.40 | 1.98 |
| | 0 | 0.47 | -0.29 | 1.44 | 0.45 | -0.30 | 1.44 | 0.46 | -0.31 | 1.44 |
| | 3 | 0.33 | -0.22 | 1.04 | 0.32 | -0.21 | 1.05 | 0.32 | -0.21 | 1.03 |
| TDLC 100ns-300Hz | -6 | 0.41 | -1.33 | 2.87 | 0.42 | -1.35 | 2.87 | 0.46 | -1.42 | 3.02 |
| | -3 | 0.34 | -0.91 | 2.09 | 0.25 | -1.02 | 1.98 | 0.30 | -1.06 | 2.24 |
| | 0 | 0.19 | -0.75 | 1.42 | 0.12 | -0.82 | 1.42 | 0.24 | -0.73 | 1.62 |
| | 3 | 0.11 | -0.61 | 1.01 | 0.12 | -0.59 | 1.04 | 0.14 | -0.59 | 1.15 |
| TDLC 100ns-150Hz | -6 | 0.41 | -1.30 | 2.83 | 0.47 | -1.24 | 2.92 | 0.53 | -1.35 | 3.24 |
| | -3 | 0.29 | -1.01 | 2.09 | 0.22 | -1.06 | 1.96 | 0.37 | -1.03 | 2.32 |
| | 0 | 0.17 | -0.74 | 1.43 | 0.18 | -0.74 | 1.47 | 0.18 | -0.83 | 1.59 |
| | 3 | 0.10 | -0.59 | 0.99 | 0.12 | -0.57 | 1.04 | 0.11 | -0.62 | 1.12 |

SIDELINK COMMUNICATION

This application is a Continuation Application of International Application No. PCT/KR2021/004042, filed on Apr. 1, 2021, which claims the benefit of and priority to Korean Application No. 10-2020-0041451, filed on Apr. 6, 2020, the contents of which are all hereby incorporated by reference herein in their entirety.

BACKGROUND OF THE DISCLOSURE

Field of the Disclosure

The present disclosure generally relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) communication is a communication scheme in which a direct link is established between User Equipments (UEs), and the UEs exchange voice and data directly with each other without intervention of a base station (BS). SL communication is under consideration as a solution to the overhead of a BS caused by rapidly increasing data traffic.

To perform an NR V2X (or SL) communication efficiently, a UE may perform measurement of a signal transmitted by another UE. However, a requirement for performing measurement by a UE has not been clearly defined conventionally. For example, conventionally, an accuracy and a side condition for a UE that performs a V2X communication to measure an RSRP have not been clearly defined. In addition, a minimum value of an RSRP value measured by a UE has also not been clearly defined conventionally.

SUMMARY

Accordingly, a disclosure of the present specification has been made in an effort to solve the aforementioned problem.

An aspect of the present disclosure provides a user equipment (UE) performing sidelink communication. The UE may include at least one transceiver; at least one processor; and at least one memory configured to store instructions and electrically connectable to the at least one processor operably. The operation performed based on the instructions executed by the at least one processor may include: receiving, from another UE, a DMRS through a PSSCH or a PSCCH; and measuring an RSRP of the DMRS based on an RSRP measurement requirement.

Another aspect of the present disclosure provides a method of performing sidelink communication by a user equipment (UE). The method may include receiving, from another UE, a DMRS through a PSSCH or a PSCCH; and measuring an RSRP of the DMRS based on an RSRP measurement requirement.

Still another aspect of the present disclosure provides an apparatus for mobile communication. The apparatus may include at least one processor; and at least one memory configured to store instructions and to be electrically connectable to the at least one processor operably, and the operation performed based on the instructions executed by the at least one processor may include: obtaining a DMRS through a PSSCH or a PSCCH from another apparatus; and measuring an RSRP of the DMRS based on an RSRP measurement requirement.

Still another aspect of the present disclosure provides a non-transitory computer readable storage medium recording instructions. The operation performed based on the instructions executed by one or more processors may include: obtaining a DMRS through a PSSCH or a PSCCH from another apparatus; and measuring an RSRP of the DMRS based on an RSRP measurement requirement.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 9 illustrates an example of the simulation result for PSCCH-RSRP according to a disclosure of the present specification.

FIG. 10 illustrates an example of the simulation result for PSSCH-RSRP according to a disclosure of the present specification.

DESCRIPTION OF EXEMPLARY EMBODIMENTS

Figure 1:
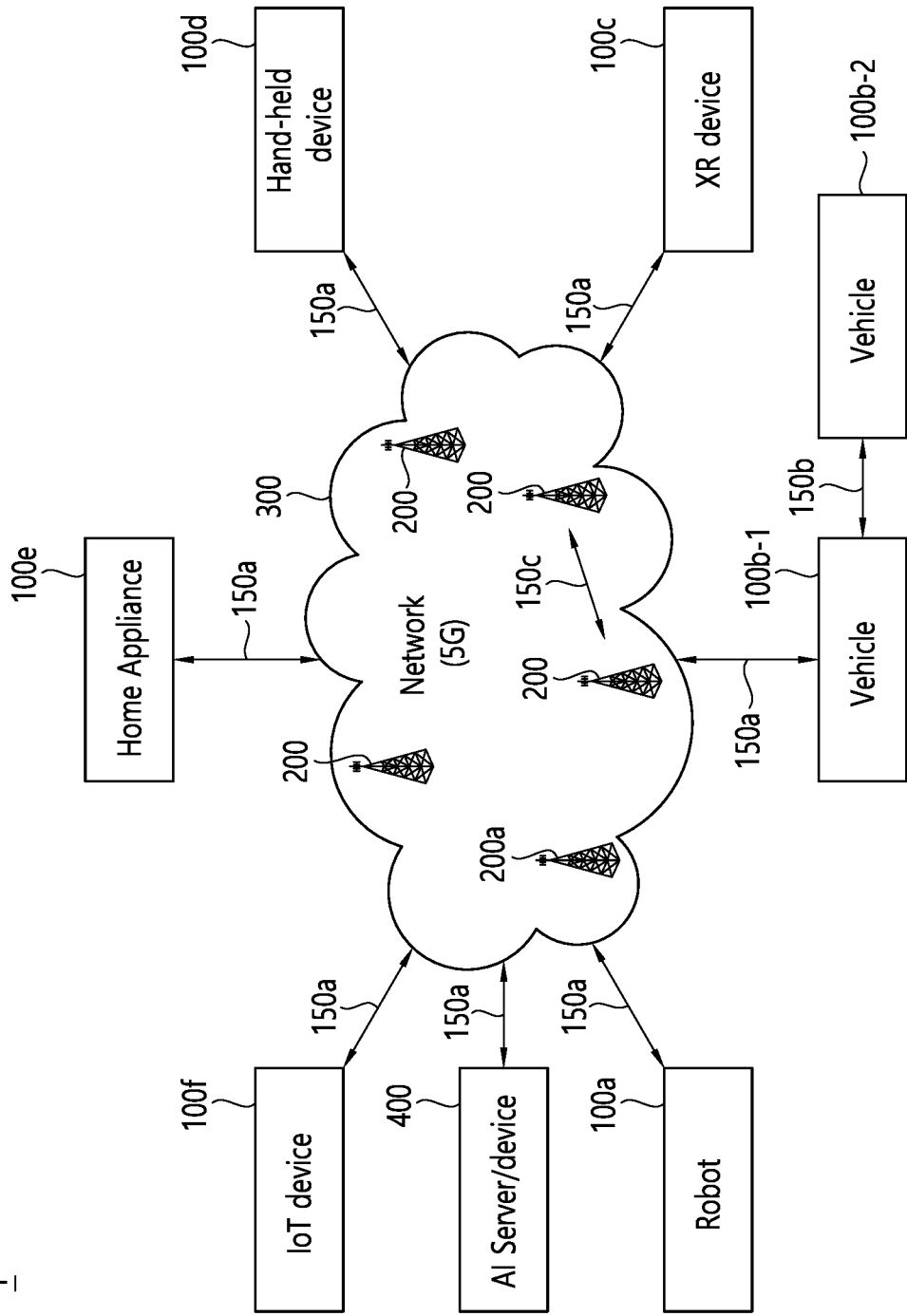
FIG. 1 shows an example of a communication system to which implementations of the present disclosure are applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, a User Equipment (UE) is shown in an exemplary manner, however, the shown UE may also be referred to as a term such as a Terminal, a Mobile Equipment (ME), and the like. Furthermore, the UE may be not only a portable device such as a notebook, a mobile phone, a PDA, a smart phone, a multimedia device, and the like, but also a non-portable device such as a PC and a vehicle mounted device.

Hereinafter, a UE is used as an example of a wireless communication device (or wireless apparatus or a wireless device) for which wireless communication is available. The operation performed by a UE may be performed by a wireless communication device. The wireless communication device may also be referred to as a wireless apparatus or a wireless device. Hereinafter, an AMF may mean an AMF node, an SMF may mean an SMF node, and a UPF may mean a UPF node.

The term, "base station" used below may be referred to as a fixed station that communicates with a wireless device, generally, and may also be called a different term such as an evolved-NodeB (eNodeB), an evolved-NodeB (eNB), a Base Transceiver System (BTS), an Access Point, a Next generation NodeB (gNB), and the like.

I. Technique and Procedure Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
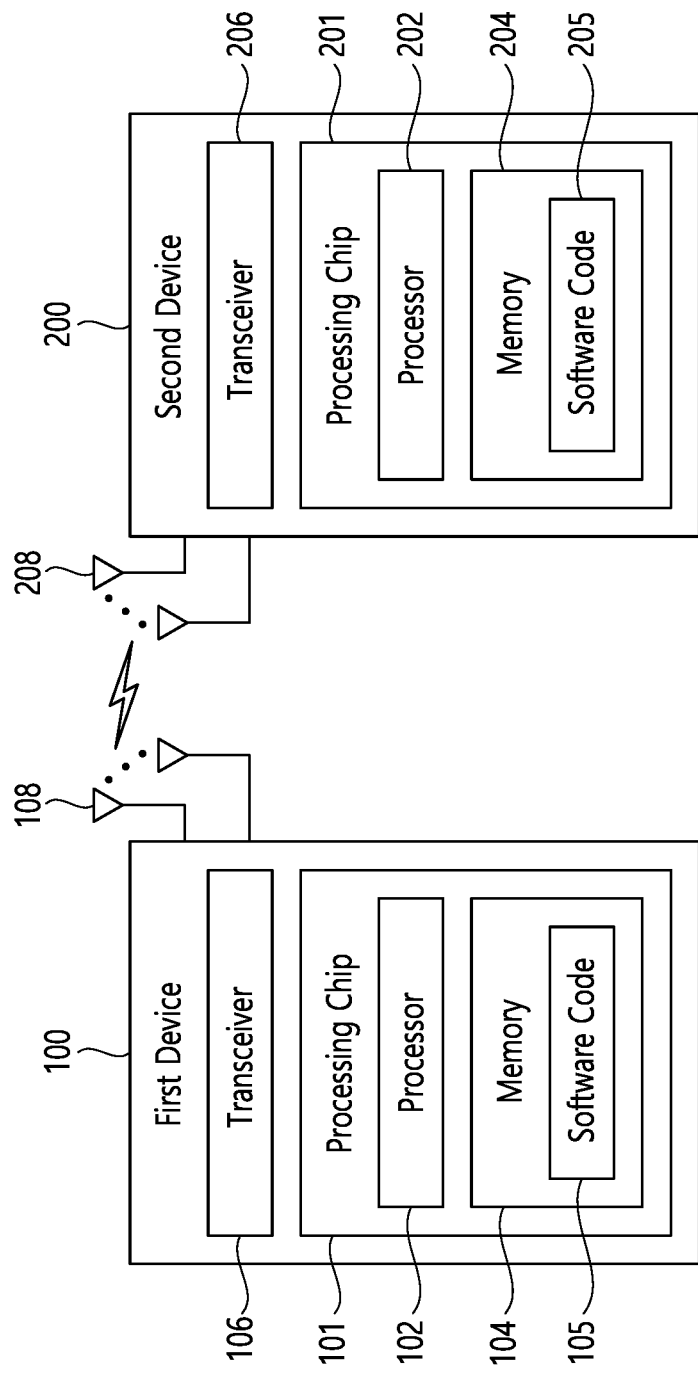
FIG. 2 shows an example of wireless devices to which implementations of the present disclosure are applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
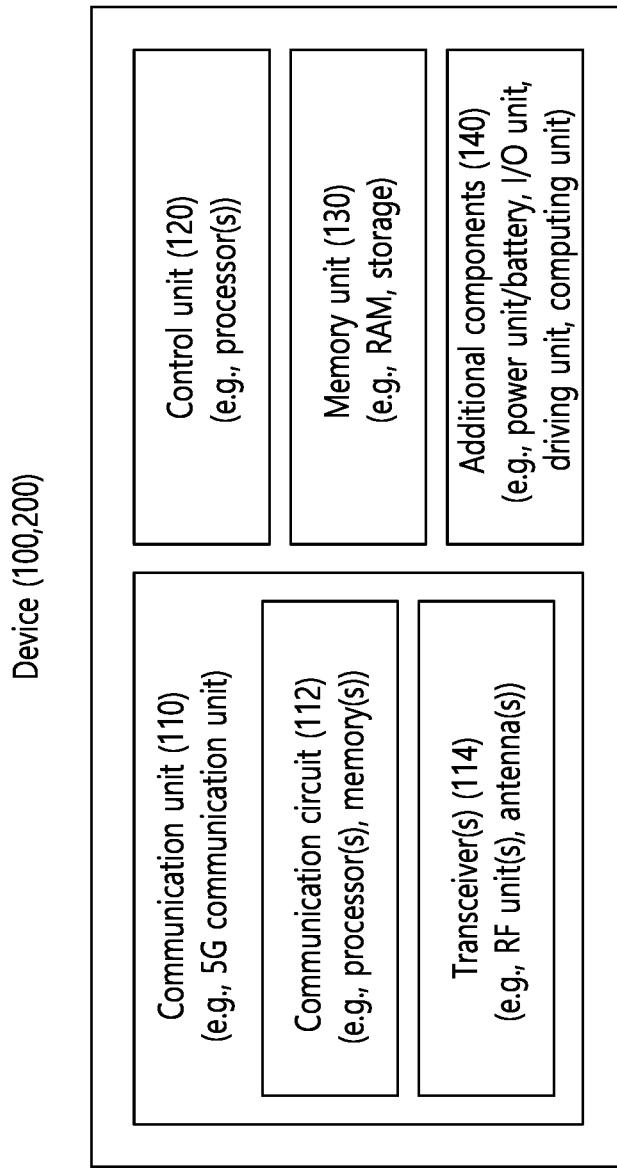
FIG. 3 shows an example of a wireless device to which implementations of the present disclosure are applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
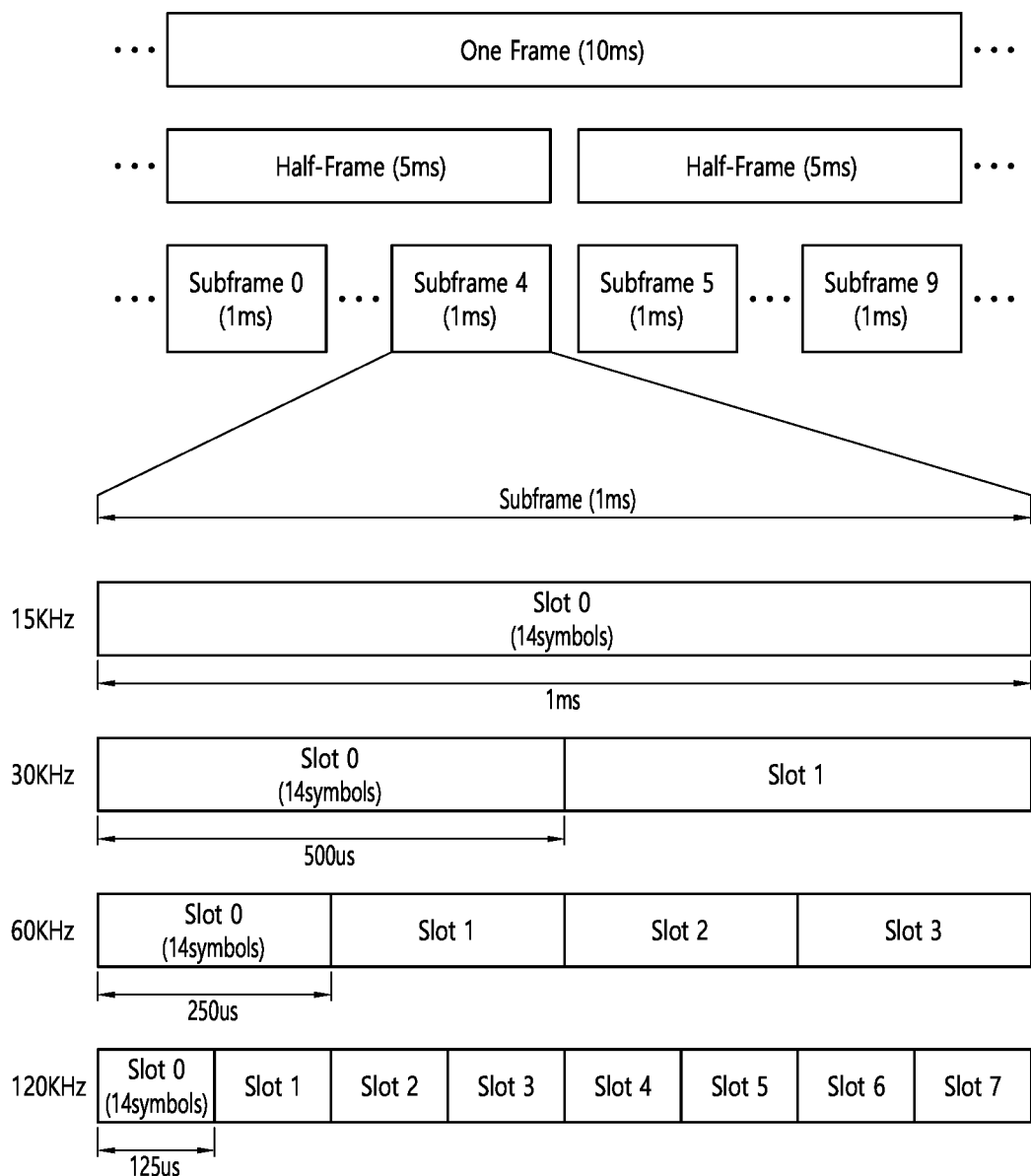
FIG. 4 illustrates an example of a structure of an NR system to which the implementation of the present disclosure is applied.

FIG. 4 illustrates an example of a structure of an NR system to which the implementation of the present disclosure is applied.

FIG. 4 shows a structure of an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In the case that a normal CP is used, each slot may include 14 symbols. In the case that an extended CP is used, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Figure 5:
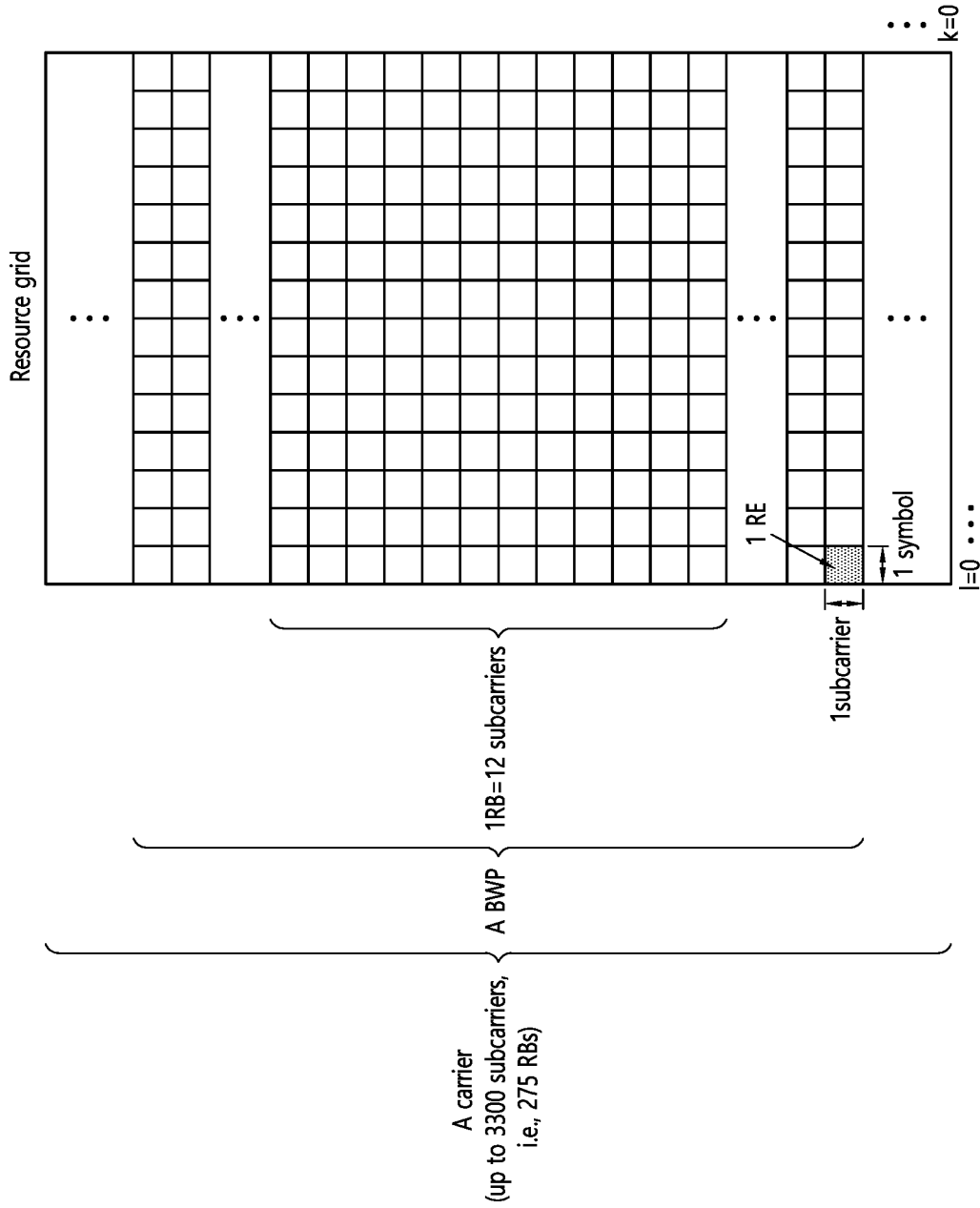
FIG. 5 illustrates an example of a structure of a slot of an NR system to which the implementation of the present disclosure is applied.

FIG. 5 illustrates an example of a structure of a slot of an NR system to which the implementation of the present disclosure is applied.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one type of numerology (e.g., SCS, CP length, etc.). A carrier may include a maximum of N BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, V2X or SL communication will be described.

Figure 6A:
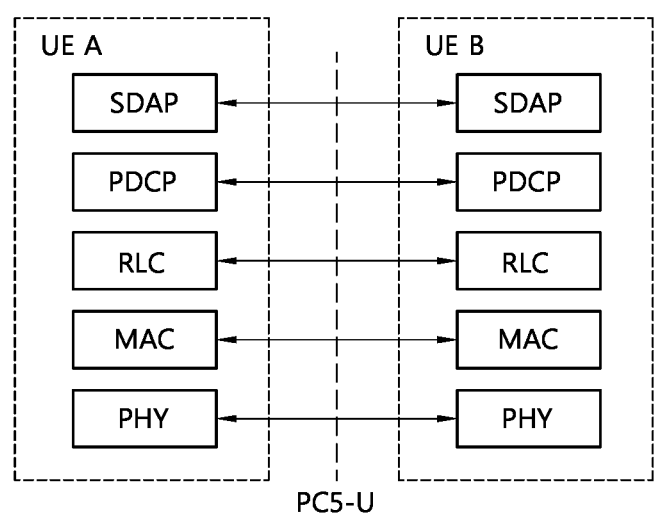
FIGS. 6a and 6b illustrate an example of a radio protocol architecture for a SL communication to which the implementation of the present disclosure is applied.
Figure 6B:
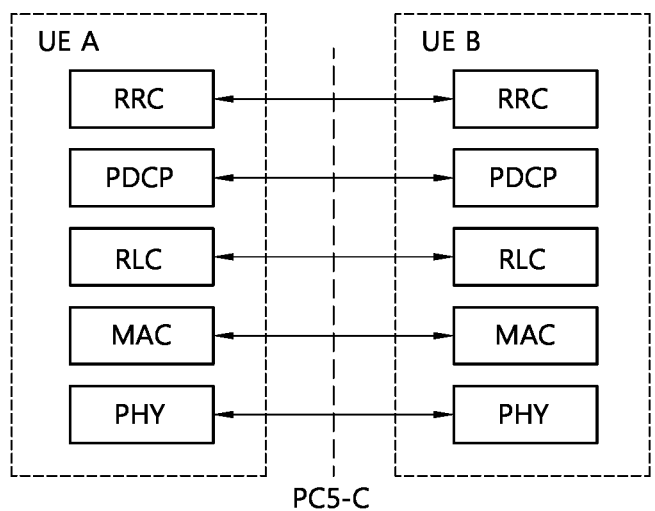

FIGS. 6a and 6b illustrate an example of a radio protocol architecture for a SL communication to which the implementation of the present disclosure is applied.

FIG. 6a and FIG. 6b show a radio protocol architecture for a SL communication, in accordance with an embodiment of the present disclosure. The embodiment of FIG. 6a and FIG. 6b may be combined with various embodiments of the present disclosure. More specifically, FIG. 6a shows a user plane protocol stack, and FIG. 6b shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which needs to be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
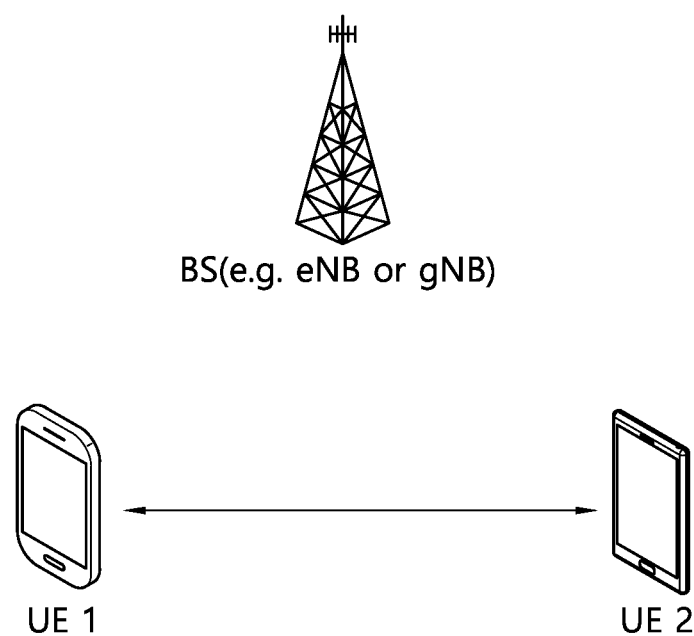
FIG. 7 illustrates an example of a UE performing V2X or SL communication to which the implementation of the present disclosure is applied.

FIG. 7 illustrates an example of a UE performing V2X or SL communication to which the implementation of the present disclosure is applied.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term "terminal" may generally imply a UE of a user. However, in the case that a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, in the case that the UE 1 is within a connectivity range of the BS, the BS may inform the UE 1 of the resource pool. On the other hand, in the case that the UE 1 is out of the connectivity range of the BS, another UE may inform the UE 1 of the resource pool, or the UE 1 may use a pre-configured resource pool.

In general, the resource pool may be configured in units of a plurality of resources, and each UE may select a unit of one or a plurality of resources to use it in SL signal transmission thereof.

Hereinafter, resource allocation in SL will be described.

Figure 8A:
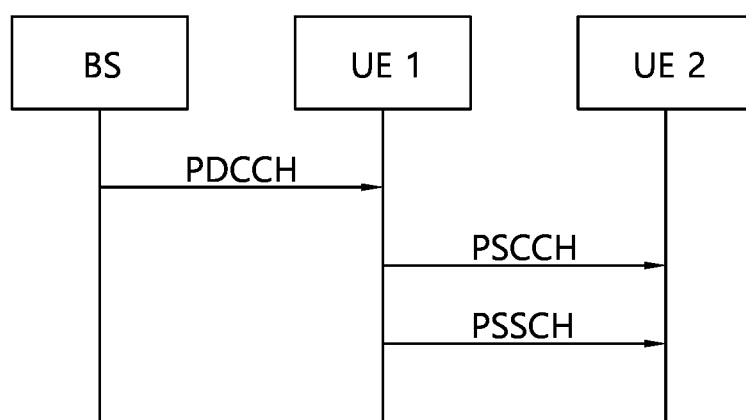
FIGS. 8a and 8b illustrate an example of a procedure of performing V2X or SL communication by a UE based on a transmission mode to which the implementation of the present disclosure is applied.
Figure 8B:
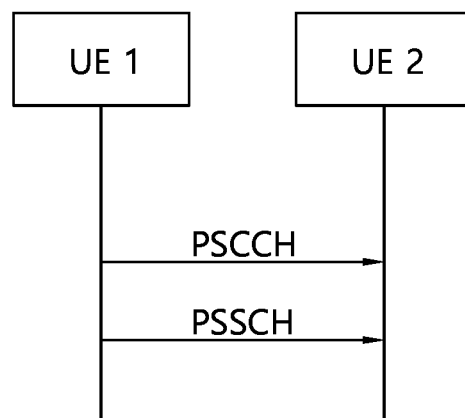

FIGS. 8a and 8b illustrate an example of a procedure of performing V2X or SL communication by a UE based on a transmission mode to which the implementation of the present disclosure is applied.

FIG. 8a and FIG. 8b show a procedure of performing V2X or SL communication by a UE based on a transmission mode, in accordance with an embodiment of the present disclosure. The embodiment of FIG. 8a and FIG. 8b may be combined with various embodiments of the present disclosure. In various embodiments of the present disclosure, the transmission mode may be called a mode or a resource allocation mode. Hereinafter, for the convenience of explanation, in LTE, the transmission mode may be called an LTE transmission mode. In NR, the transmission mode may be called an NR resource allocation mode.

For example, FIG. 8a shows a UE operation related to an LTE transmission mode 1 or an LTE transmission mode 3. Alternatively, for example, FIG. 8a shows a UE operation related to an NR resource allocation mode 1. For example, the LTE transmission mode 1 may be applied to general SL communication, and the LTE transmission mode 3 may be applied to V2X communication.

For example, FIG. 8b shows a UE operation related to an LTE transmission mode 2 or an LTE transmission mode 4. Alternatively, for example, FIG. 8b shows a UE operation related to an NR resource allocation mode 2.

Referring to FIG. 8a, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 8b, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in units of subchannels. In addition, the UE 1 which has autonomously selected the resource within the resource pool may transmit the SCI to the UE 2 through a PSCCH, and thereafter may transmit data based on the SCI to the UE 2 through a PSSCH.

For reference, Table 3 below represents an example of an operating band used for V2X (or SL) communication.

TABLE 3

| Operating Band | V2X Operating Band | V2X UE transmit $F_{UL\_low}$ – $F_{UL\_high}$ | V2X UE receive $F_{DL\_low}$ – $F_{DL\_high}$ | Duplex Mode | Interface |
|---|---|---|---|---|---|
| 47 | 47 | 5855 MHz–5925 MHz | 5855 MHz–5925 MHz | HD(Half Duplex) | PC5 |
| 39 | 39 | 1880 MHz–1920 MHz | 1880 MHz–1920 MHz | TDD | PC5 and/or Uu |

In the case that an operating band 47 according to the example of Table 3 is used for E-UTRA V2X (or SL) communication, the operating band 47 may be referred to as B47. In the case that the operating band 47 according to the example of Table 3 is used for NR V2X (or SL) communication, the operating band 47 may be referred to as n47. In the case that an operating band 39 according to the example of Table 3 is used for E-UTRA V2X (or SL) communication, the operating band 39 may be referred to as B39. In the case that the operating band 39 according to the example of Table 3 is used for NR V2X (or SL) communication, the operating band 39 may be referred to as n39.

For reference, at least one proposal scheme proposed according to various embodiments of the present disclosure may be applied to not only sidelink communication or V2X communication based on a PC5 interface or an SL interface (e.g., PSCCH, PSSCH, PSBCH, PSSS/SSSS, etc.), but also sidelink communication or V2X communication based on a Uu interface (e.g., PUSCH, PDSCH, PDCCH, PUCCH, etc.).

In the various embodiments of the present disclosure, a receiving operation of a UE may include a decoding operation and/or a receiving operation of a sidelink channel and/or a sidelink signal (e.g., PSCCH, PSSCH, PSFCH, PSBCH, PSSS/SSSS, etc.). In the various embodiments of the present disclosure, a transmitting operation of a UE may include a transmitting operation of a sidelink channel and/or a sidelink signal (e.g., PSCCH, PSSCH, PSFCH, PSBCH, PSSS/SSSS, etc.).

Meanwhile, in the various embodiments of the present disclosure, for example, for the convenience of description, a (physical) channel used for an RX UE to transmit at least one of the following information to a TX UE may be referred to as PSFCH.

SL HARQ feedback, SL CSI, SL (L1) RSRP

Meanwhile, in the various embodiments of the present disclosure, a Uu channel may include a UL channel and/or a DL channel. For example, the UL channel may include PUSCH, PUCCH, and the like. For example, the DL channel may include PDCCH, PDSCH, and the like. For example, an SL channel may include PSCCH, PSSCH, PSFCH, PSBCH, and the like.

<Measurement>

In this case, a UE may perform measurement by using three methods as exemplified below.

1) RSRP (reference signal received power): This may represent average reception power of all UEs that carry a reference signal (e.g., DMRS) which is transmitted throughout the entire band.

2) RSSI (received signal strength indicator): This may represent a reception power measured throughout the entire band. The RSSI may include all of a signal, interference, and a thermal noise.

3) RSRQ (reference symbol received quality): This may represent a channel quality indicator (CQI) and may be determined by a measurement bandwidth or the RSRP/RSSI according to a sub-band. That is, an RSRQ may imply a signal-to-noise interference ratio (SINR). Since the RSRP is unable to provide sufficient mobility information, the RSRQ may be used instead of the RSRP in a handover or cell reselection procedure.

It may be calculated: RSRQ=RSSI/RSSP.

II. Disclosure of the Present Specification

The disclosures described below in the present specification may be implemented in one or more combinations (e.g., a combination including at least one of the contents described below). Each of the drawings shows an embodiment of the present disclosure, but the embodiments of the drawing may be implemented in combination with each other.

The description of the method proposed in the disclosure of the present specification may be composed of a combination of one or more operations/configurations/steps described below. The following methods described below may be performed or used in combination or complementarity.

For reference, in the disclosure of the present specification, sidelink (SL), V2X, V2X sidelink (SL) may have the same meaning.

The disclosure of the present specification describes a method for a UE to perform V2X communication efficiently. For example, in the disclosure of the present specification the requirement related to the measurement used for a UE to perform V2X (or the sidelink) communication will be described. The measurement requirement described in the disclosure of the present specification may be used in the process that a UE performs V2X (or the sidelink) communication. The measurement requirement described in the disclosure of the present specification may be used in the process of testing a UE.

The disclosure of the present specification proposes the requirement related to the measurement of an NR V2X Sidelink channel (PSSCH and PSCCH). For example, the disclosure of the present specification may propose the RSRP measurement accuracy of the NR V2X Sidelink channel (PSSCH and PSCCH). For example, the disclosure of the present specification may propose a side condition (e.g., signal-to-noise ratio (SNR) of a signal in which the NR V2X Sidelink channel is received) that needs to be at least guaranteed in the RSRP measurement of the NR V2X Sidelink channel (PSSCH and PSCCH).

A NR V2X UE may measure reception power of PSSCH-DMRS and/or PSCCH-DMRS as a method for checking whether a neighboring UE is used in an allocated resource pool. The PSSCH-DMRS may imply a Demodulation Reference Signal (DMRS) transmitted in PSSCH. The PSCCH-DMRS may imply the DMRS transmitted in PSCCH. For example, the NR V2X UE may measure the reception power of PSSCH-DMRS and/or PSCCH-DMRS transmitted by the neighboring UE in the allocated resource pool. By measuring the reception power of PSSCH-DMRS and/or PSCCH-DMRS, the NR V2X UE may checking whether the neighboring UE transmits PSSCH-DMRS and/or PSCCH-DMRS using the allocated resource pool.

Here, the NR V2X UE may be a UE which may perform the V2X communication. Here, the resource pool may imply a set of a series of resources used for the NR V2X UE to transmit and/or receive the SL signal. The resource pool may be allocated to the NR V2X UE by a BS. Alternatively, the NR V2X UE may receive information of the resource pool allocated to the NR V2X UE from another UE.

A requirement related to the measurement needs to be defined so that the result measured by the NR V2X UE (e.g., measurement value) may be valid. That is, to ensure the valid measurement value, for example, the minimum received power level, the reception SNR, and/or the measurement accuracy need to be defined. However, conventionally, the requirement related to the measurement has not been clearly defined.

In the disclosure of the present specification, the requirement related to PSSCH-RSRP and/or PSCCH-RSRP (e.g., SNR, measurement accuracy, and/or the minimum RSRP value) is proposed.

In the disclosure of the present specification, to define the requirement related to the measurement of the NR V2X UE, a simulation is conducted. For example, the simulation is conducted by assuming the minimum number of Resource Blocks (RBs) that can be allocated to PSSCH and/or PSCCH.

Table 4 below represents an example of the simulation assumption used in the simulation performed in the disclosure of the present specification. For example, Table 4 below may represent the assumption used in the simulation to define the requirement related to the measurement of the NR V2X UE. Specifically, an example of the simulation assumption for PSSCH-RSRP measurement and PSCCH-RSRP measurement is represented.

TABLE 4

| Parameter | Value | Comments |
| --- | --- | --- |
| Duplex mode | TDD | |
| Measurement bandwidth for PSSCH-RSRP | 10 resource blocks | Minimum {10, 15, 20, 25, 50, 75, 100} PRBs (possible sub-channel size) |
| Measurement bandwidth for PSCCH-RSRP | 10 resource blocks | Minimum {10, 12, 15, 20, 25} PRBs (candidate numbers of PRBs) |
| Duration of the scheduled resources for transmission of PSSCH ($1_d$) | 9 symbols | Refer Table 5 |
| Number of PSCCH symbol in a slot(l = PSCCH symbol position) | 2 symbols(l = {1, 2}) | Refer Table 5 |
| Number of PSSCH DMRS symbol in a slot(l= PSSCH DMRS position) | 2 symbols (l = {3, 8}) | Refer Table 5 |
| Sub Carrier Spacing | 15 kHz, 30 kHz, 60 kHz | |
| L1 measurement | 1 shot measurement | |
| L3 filtering | Disabled | |
| Transmit antenna | 1 | |
| Receive antennas | 2 | Note that the measured value shall not be lower than the corresponding value of any of the individual diversity branches.<br>For example, the UE may include two Rx antennas (Rx#1 and Rx#2). In this case, the UE may use the maximum value (i.e., max (RSRP#1, RSRP#2)) as a RSRP between RSRP#1 measured by the UE using Rx#1 and RSRP#2 measured by the UE using RX#2. |
| Number of DMRS CDM group(s) without data | 1 | |
| DMRS port(s) | 0 | |
| Ratio of PSSCH EPRE to DM-RS EPRE (dB) | 0 | |
| Propagation conditions | AWGN(additive white gaussian noise), TDL- C with 100 ns, 300 Hz TDL- C with 100 ns, 150 Hz | |
| CP length | Normal | |
| Carrier frequency | 5.9 GHz | |
| Frequency Offset relative to UE frequency reference | 0 Hz | |
| PSSCH_Ec/Iot | {−6, −3, 0, 3} dB | AWGN noise, The minimum SNR point is selected based on PSCCH performance.<br>For example, based on AWGN, Ec/Iot (Iot-AWGN noise) SNR may be set. Since the UE may perform the decoding of PSSCH after successful decoding of PSCCH, the SNR point which may ensure the PSCCH decoding performance may be selected. |
| PSCCH_Ec/Iot | {−6, −3, 0, 3} dB | AWGN noise, The minimum SNR point is selected based on PSCCH performance |

The simulation is conducted based on the simulation assumption shown in an example of Table 4. In the disclosure of the present specification, using the result of the simulation, the requirement related to PSSCH-RSRP and/or PSCCH-RSRP (e.g., SNR, measurement accuracy, and/or minimum RSRP value, etc.) is proposed.

The parameters shown in the example of Table 4 are parameters used to perform the simulation. In the simulation to propose the requirement related to PSSCH-RSRP and/or PSCCH-RSRP, it is assumed that a duplex mode is TDD. In the example of Table 4, a measurement bandwidth to measure PSSCH-RSRP is assumed to be 10 resource blocks. Minimum {10, 15, 20, 25, 50, 75, 100} PRBs (possible sub-channel size) may mean that 10 RBs which is the minimum size among configurable sub-channel sizes are used. That is because the RSRP measurement error becomes greater as the used number of RBs is smaller (as the number of samples becomes smaller). In the example of Table 4, the measurement bandwidth to measure PSCCH-RSRP is assumed to be 10 resource blocks. Minimum {10, 12, 15, 20, 25} PRBs (candidate numbers of PRBs) may mean that 10 RBs which is the minimum size among configurable candidate numbers of PRBs are used. For reference, Iot in the example of Table 4 may mean AWGN noise.

In the example of Table 4, duration ($l_d$) of a resource scheduled for transmission of PSSCH may be nine symbols. Table 5 below may represent the duration of a resource scheduled for transmission of PSSCH.

In the example of Table 4, the number of PSCCH symbols in one slot may be two. 1 may mean a PSSCH symbol position. For example, two symbol may be located at l={1, 2}. Table 5 below represents the number of PSCCH symbols in one slot.

In the example of Table 4, the number of PSSCH DMRS symbols in one slot may be two. 1 may mean a PSSCH DMRS symbol position. For example, two symbols may be located at l={3, 8}. Table 5 represents the number of PSSCH DMRS symbols in one slot.

In the example of Table 4, 15 kHz, 30 kHz, and 60 kHz may be used for the Sub Carrier Spacing (SCS). In the example of Table 4, for an L1 measurement, 1 shot measurement may be assumed. 1 shot measurement may mean that the RSRP is measured using only 1 slot. That is because a maximum measurement error may be considered when the RSRP is measured using only 1 slot. For example, when the RSRP is measured using 2 slots, the number of samples may be increased, and the measurement error may be reduced. Therefore, to define the requirement related to the measurement based on the maximum measurement error, the RSRP measurement based on 1 slot is performed. In the example of Table 4, L3 (Layer 3) filtering may be disabled.

The number of transmission antennas used for transmission of PSSCH and/or PSCCH may be one. The number of reception antennas used for reception of PSSCH and/or PSCCH may be two.

The Number of DMRS Code division multiplexing (CDM) group(s) without data may be one. Port 0 may be used in DMRS port. The ratio of PSSCH EPRE of DM-RS Energy per resource element (EPRE) may be 0 dB.

According to the example of Table 4, propagation conditions assumed in the simulation may include AWGN, TDL-C with 100 ns and 300 Hz, TDL-C with 100 ns, and 150 Hz. The AWGN may mean additive white gaussian noise. In Tapped Delay Line (TDL-C) with 100 ns and 300 Hz, 100 ns may mean RMS (root mean square) delay spread in second. 300 Hz may mean the Doppler spread, and this value is related to the speed of a UE. For example, in a UE using 5.9 GHz band, Doppler spread 300 Hz may mean that the speed of a UE is about 55 km/h. For example, assuming Doppler spread (Hz)=300 Hz, the speed of light=3×1e8, Fc=5.9 GHz, the speed of a UE of about 55 km/h may be calculated according to 3e8/(1000/3600)*300/5.9e9. In TDL-C with 100 ns and 150 Hz, 100 ns may represent RMS delay spread in second. 150 Hz may mean the Doppler spread. For reference, the AWGN may be the mendatory propagation condition used in the simulation.

According to the example of Table 4, a Normal CP may be used in a CP length. 5.9 GHz may be used as a Carrier frequency. A relative frequency offset of a UE frequency reference may be 0 Hz.

According to the example of Table 4, {−6, −3, 0, 3} dB may be considered with respect to PSSCH/Iot. {−6, −3, 0, 3} dB may be considered with respect to PSCCH_Ec/Iot. Herein, Ec may mean average energy per PN (Pseudorandom Noise chip). Iot may mean the power spectral density of the total noise and interference for a certain RE. For example, Ec/Iot may mean the SNR based on an RE. For reference, in consideration of PSSCH_Ec/Iot and PSCCH_Ec/Iot in the simulation, a result with respect to BLER (Block Error Rate) vs SNR may be considered.

Table 5 below is an example of a table referenced in Table 4.

TABLE 5

| $l_d$ in symbols | DM-RS position I | | | | | |
|---|---|---|---|---|---|---|
| | PSCCH duration 2 symbols Number of PSSCH DM-RS | | | PSCCH duration 3 symbols Number of PSSCH DM-RS | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

It is represented the number of symbols $l_d$ used in PSSCH including PSCCH, the number of symbols (2 or 3) used in PSCCH, and the number of DMRSs used in PSSCH.

In the case that the simulation based on the simulation assumption of Table 4 is conducted, the performance metrics as represented in the example below may be considered.

For example, the performance metrics for PSSCH-RSRP is as represented below. The performance metrics below for PSSCH-RSRP may be considered.

A CDF (Cumulative Distribution Function) curve for delta PSSCH-RSRP may be considered as the performance metrics for PSSCH-RSRP. The CDF curve may include 95% CDF point and 5% CDF point.

Herein, the delta PSSCH-RSRP may be defined as the example below:

Delta PSSCH-RSRP=Measured PSSCH-RSRP−Ideal PSSCH-RSRP.

The Measured PSSCH-RSRP may mean PSSCH-RSRP which is actually measured. The Ideal PSSCH-RSRP may mean ideal PSSCH-RSRP. For example, assuming a perfect channel estimation, the Ideal PSSCH-RSRP may be defined as an ideal PSSCH-RSRP measured using the same sampling late and the same sampling occasion used in the actual measurement.

For example, the performance metrics for PSCCH-RSRP are as below. The performance metrics below for PSCCH-RSRP may be considered.

A CDF (Cumulative Distribution Function) curve for delta PSCCH-RSRP may be considered as the performance metrics for PSCCH-RSRP. This CDF curve may include 95% CDF point and 5% CDF point.

Herein, the delta PSCCH-RSRP may be defined as represented in the example below.

Delta PSCCH-RSRP=Measured PSCCH-RSRP−Ideal PSCCH-RSRP.

The Measured PSCCH-RSRP may mean actually measured PSCCH-RSRP. The Ideal PSCCH-RSRP may mean the ideal PSCCH-RSRP. For example, assuming perfect channel estimation, the Ideal PSCCH-RSRP may be defined as the ideal PSCCH-RSRP measured using the same sampling late and the same sampling occasion used in the actual measurement.

Hereinafter, the simulation result for PSSCH-RSRP and the simulation result for PSCCH-RSRP will be described.

FIG. 9 illustrates an example of the simulation result (e.g., a result of measuring delta PSCCH-RSRP) for PSCCH-RSRP.

The drawings below are documented for the explanation of the specific example of the present specification. Since the name of the specific device or specific signal/message/field described in the drawing is exemplary presented, the technical features of the present specification are not limited to the specific name used in the drawing below.

FIG. 9 illustrates an example of the simulation result for PSCCH-RSRP according to a disclosure of the present specification.

The example of FIG. 9 shows a result of measuring the delta PSCCH-RSRP. For example, the example of FIG. 9 shows the delta PSCCH-RSRP measured considering three types of propagation conditions (e.g., AWGN (additive white gaussian noise), TDLC 100 ns-300 Hz, and TDLC100 ns-150 Hz).

For reference, the conventional LTE V2X absolute PSSCH-RSRP measurement accuracy requirement condition is ±5 dB. In the example of FIG. 9, in the case that the implementation margin 1.5 dB is added to the values of satisfying the CDF curve 95%, the conventional LTE V2X absolute PSSCH-RSRP measurement accuracy requirement condition may be satisfied.

The example of FIG. 9 shows the delta PSCCH-RSRP accuracy.

The example of FIG. 9 shows the simulation result performed according to the simulation result represented in Table 4. For example, in the case that a propagation condition is the AWGN, the SCS may be 15 kHz, the delta PSCCH-RSRP value satisfying the CDF curve 95% may be 1.25 dB, and the BLER may be 0.00. For another example, in the case that the propagation condition is TDLC100 ns-300 Hz, the SCS may be 30 kHz, the delta PSCCH-RSRP value satisfying the CDF curve 95% when the SNR is 0 dB or greater may be 1.22 dB, and the BLER may be 0.05.

In addition, in the example of FIG. 9, the case that the BLER (Block Error Rate) of NR V2X PSCCH is 1% or smaller is marked with a bold line. Particularly, according to the example of FIG. 9, in the case that a propagation condition is the AWGN, the SCS is −3 dB or greater, 0 dB or greater, and 3 dB or greater, the BLER may be 1% or smaller.

Referring to the example of FIG. 9, it is proposed that the SNR value is 0 dB or greater as a side condition or an additional condition for the PSCCH-RSRP measurement accuracy. Specifically, referring to the example of FIG. 9, SNR≥0 dB is proposed as a side condition or an additional condition for the PSCCH-RSRP measurement accuracy considering an implementation margin with respect to PSCCH-BLER when a propagation condition is the AWGN. In addition, considering an implementation margin, the measurement accuracy is proposed to be ±4.5 dB.

In summary, referring to the example of FIG. 9, the example of the proposal in the disclosure of the present specification of PSCCH-RSRP measurement is as follows:

Proposal 1: Define side condition for PSCCH-RSRP measurement accuracy with SNR≥0 dB. That is, it is proposed to define SNR≥0 dB as a side condition or an additional condition for PSCCH measurement accuracy.

Proposal 2: Define ±4.5 dB for PSCCH-RSRP measurement accuracy for SCS of 15 kHz, 30 kHz and 60 kHz. That is, in the case that the SCS is 15 kHz, 30 kHz, and 60 kHz, it is proposed to define the value of PSCCH-RSRP measurement accuracy as ±4.5 dB.

FIG. 10 illustrates an example of the simulation result for PSSCH-RSRP (e.g., the result of measuring the delta PSCCH-RSRP).

The drawings below are documented for the explanation of the specific example of the present specification. Since the name of the specific device or specific signal/message/field described in the drawing is exemplary presented, the technical features of the present specification are not limited to the specific name used in the drawing below.

FIG. 10 illustrates an example of the simulation result for PSSCH-RSRP according to a disclosure of the present specification.

The example of FIG. 10 shows the measurement result of the delta PSSCH-RSRP. For example, the example of FIG. 10 shows the delta PSSCH-RSRP measured considering three propagation conditions (e.g., AWGN (additive white gaussian noise)), TDLC 100 ns-300 Hz, and TDLC 100 ns-150 Hz. For reference, after successfully decoding PSCCH, a UE may receive PSSCH. Therefore, in the example of FIG. 10, unlike the example of FIG. 9, the BLER related to PSSCH is not considered.

For reference, the conventional LTE V2X absolute PSSCH-RSRP measurement accuracy requirement condition is ±5 dB. In the example of FIG. 9, in the case that the implementation margin 1.5 dB is added to the values of satisfying the CDF curve 95%, the conventional LTE V2X absolute PSSCH-RSRP measurement accuracy requirement condition may be satisfied.

The example of FIG. 10 shows the delta PSSCH-RSRP accuracy.

The example of FIG. 10 shows the simulation result performed according to the simulation result represented in Table 4. For example, in the case that a propagation condition is the AWGN, the SCS may be 15 kHz, and the delta PSCCH-RSRP value satisfying the CDF curve 95% may be 1.44 dB. For another example, in the case that the propagation condition is TDLC100 ns-300 Hz, the SCS may be 30 kHz, and the delta PSCCH-RSRP value satisfying the CDF curve 95% when the SNR is −3 dB or greater may be 1.98 dB.

Referring to the example of FIG. 10, it is proposed that the SNR value is 0 dB or greater as a side condition or an additional condition for the PSCCH-RSRP measurement accuracy. For reference, since a UE may receive PSSCH after successfully decoding PSCCH, the BLER related to PSCCH decoding may be applied to PSSCH. Therefore, for the same purpose as described in the example of FIG. 9, it is proposed that the SNR value is 0 dB or greater. Specifically, referring to the example of FIG. 10, SNR≥0 dB is proposed as a side condition or an additional condition for the PSCCH-RSRP measurement accuracy considering an implementation margin when a propagation condition is the AWGN. In addition, considering an implementation margin, the measurement accuracy is proposed to be ±4.5 dB.

In summary, referring to the example of FIG. 10, the example of the proposal in the disclosure of the present specification of PSSCH-RSRP measurement is as follows:

Proposal 3: Define side condition for PSSCH-RSRP measurement accuracy with SNR≥0 dB. That is, it is proposed to define SNR≥0 dB as a side condition or an additional condition for PSSCH measurement accuracy.

Proposal 4: Define ±4.5 dB for PSSCH-RSRP measurement accuracy for SCS of 15 kHz, 30 kHz and 60 kHz. That is, in the case that the SCS is 15 kHz, 30 kHz, and 60 kHz, it is proposed to define the value of PSSCH-RSRP measurement accuracy as ±4.5 dB.

In Proposals 1 and 3 described above, a tolerance (e.g., L) may be applied to the additional conditions for the PSSCH-RSRP measurement accuracy and/or the PSCCH-RSRP measurement accuracy. For example, the additional conditions for the RSRP measurement accuracy (e.g., PSSCH-RSRP measurement accuracy and/or PSCCH-RSRP measurement accuracy) may be proposed as SNR≥0 dB+Δ. Here, Δ may have a range of −3 to +3.

In Proposals 2 and 4 above, the absolute measurement accuracy is proposed for the PSSCH-RSRP measurement accuracy and/or the PSCCH-RSRP measurement accuracy. For example, in Proposals 2 and 4, the tolerance (e.g., Δ) may be applied in the RSRP measurement accuracy (e.g., PSSCH-RSRP measurement accuracy and/or PSCCH-RSRP measurement accuracy). In one example, the RSRP measurement accuracy (e.g., PSSCH-RSRP measurement accuracy and/or PSCCH-RSRP measurement accuracy) may be proposed to be ±(4.5 dB+Δ). Herein, Δ may be set in the range of {−0.5, 0, 0.5, 1.0, 1.5}.

According to Proposals 1 to 4 described above, the additional condition for the RSRP measurement accuracy proposed in the disclosure of the present specification (e.g., PSSCH-RSRP measurement accuracy and/or PSCCH-RSRP measurement accuracy) and minimum reception level value (e.g., minimum RSRP value) for guarantying the RSRP measurement accuracy (e.g., PSSCH-RSRP measurement accuracy and/or PSCCH-RSRP measurement accuracy) is proposed.

Specifically, hereinafter, considering the equations related to the REFSENS (Reference sensitivity) and the minimum reception level, it is proposed to configure a minimum reception level value.

Equation 1 below is an example of the equation representing the REFSENS. Equation 1 represents the REFSENS considering the 10 MHz CBW (channel bandwidth), the NF (noise figure), and the IM (implementation margin).

$$\text{REFSENS}=-174 \text{ dBm (kT)}+10*\log 10(10*1e6)+ \text{NF}-\text{diversity gain}+\text{SNR}+\text{IM} \quad \text{[Equation 1]}$$

In Equation 1, IM may be −2.5 dB. In Equation 1, kT may mean the product of Boltzmann constant k and temperature T. The unit of kT may be dBm/Hz. 1e6 may mean 1,000,000.

Equation 2 below is an example of the equation representing a minimum reception level (dBm/SCS). For example, Equation 2 may represent the minimum reception level of an RSRP value.

$$\text{Minimum reception level (dBm/SCS)}=-174 \text{ dBm (kT)}+\text{NF}+\text{IM}+10*\log 10(\text{SCS})+\text{side condition} \quad \text{[Equation 2]}$$

In Equation 2, IM may be −2.5 dB. The side condition may mean the additional condition for the RSRP measurement accuracy (e.g., PSSCH-RSRP measurement accuracy and/or PSCCH-RSRP measurement accuracy) suggested in the disclosure of the present specification.

In Equation 2, NF=9 dB, diversity gain=3 dB, SNR=−1 dB, and IM=2.5 dB are assumed for a frequency band (e.g., operation band) n38 and/or a frequency band (e.g., operation band) n47. For reference, when defining standard (or requirement) related to a reception sensibility, SNR=−1 dB may be a SNR value. In the state that the assumption is applied, when the content of Equation 1 is substituted in Equation 2, the minimum reception level may be defined as represented in Equation 3 below.

$$\text{Minimum reception level (dBm/SCS)}=\text{REFSENS (dBm/10 MHz)}-10*\log 10(10*1e6)+\text{diversity gain}-\text{SNR}+10*\log 10(\text{SCS})+\text{side condition} \quad \text{[Equation 3]}$$

For a frequency band n38 and/or a frequency band n47, Equation 3 is applied. NF=9 dB, diversity gain=3 dB, SNR=−1 dB, and IM=2.5 dB may be substituted in Equation 3.

Each of the minimum reception level (e g, minimum value of RSRP) of the frequency band (e.g., operation band) n38 and/or the frequency band (e.g., operation band) n47 may be determined by substituting the respective RSFSENS values of the frequency band (e.g., operation band) n38 and/or the frequency band (e.g., operation band) n47 to Equation 3.

For example, the example of each of the REFSENS (e.g., X dBm/10 MHz) of the frequency band (e.g., operation band) n38 and/or the frequency band (e.g., operation band) n47 may be as represented below. In one example, the REFSENS of the frequency band (e.g., operation band) n47 may be −92.5 dBm. The REFSENS of the frequency band (e.g., operation band) n38 may be −96.8 dBm.

Substituting REFSENS=−92.5 dBm and REFSENS=−96.8 dBm to Equation 3, the minimum reception level may be calculated as represented in the example below. Only in the case that the SCS is 15 kHz, a specific minimum reception level is described, and in the case that the SCS is 30 kHz and 60 kHz, the minimum reception level may be calculated as the same manner.

For example, in the case that the SCS=15 kHz, the minimum reception level for the frequency band (e.g., operation band) n47 may be determined substituting REFSENS=−92.5 dBm to Equation 3. For example, the minimum reception level for the frequency band (e.g., operation band) n47 may be −92.5−10*log 10(10*1e6)+diversity gain (3 dB)−SNR (−1 dB)+10*log 10(SCS)+side condition (0 dB)=−117 dBm.

For example, in the case that the SCS=15 kHz, the minimum reception level for the frequency band (e.g., operation band) n38 may be determined substituting REFSENS=−96.8 dBm to Equation 3. For example, the minimum reception level for the frequency band (e.g., operation band) n38 may be −96.8−10*log 10(10*1e6)+diversity gain (3 dB)−SNR (−1 dB)+10*log 10(SCS)+side condition (0 dB)=−121 dBm For reference, in the case that the SCS=15 kHz, −121 dBm which is the example of the minimum reception level for −117 dBm frequency band (e.g., operation band) n38 which is the example of minimum reception level for the frequency band (e.g., operation band) n47 is merely an example. The diversity gain value (e.g., 3 dB) and/or the SNR value (e.g., −1 dB) of the example described above is merely an example, and the minimum reception level of the frequency band (e.g., operation band) n38 and the minimum reception level of the frequency band (e.g., operation band) n47 may be set as another value according to the actually applied diversity gain and SNR.

In the disclosure of the present specification, it is proposed to define the minimum reception level of the frequency band (e.g., operation band) n38 and the minimum reception level of the frequency band (e.g., operation band) n47 as represented in the example of Table 6 and the example of Table 7.

The example of Table 6 may represent the Minimum Conditions for Absolute PSSCH-RSRP Accuracy Requirements. The minimum value of PSSCH-RSRP with respect to the example of Table 6 may be applied to the operation band n38 and the operation band n47. The example of Table 6, for example, may represent the Absolute PSSCH-RSRP Requirements for FR1.

TABLE 6

| NR V2X | Minimum PSSCH-RSRP dBm/SCS$_{PSSCH}$ | | |
|---|---|---|---|
| operating band groups | SCS$_{PSSCH}$ = 15 kHz | SCS$_{PSSCH}$ = 30 kHz | SCS$_{PSSCH}$ = 60 kHz |
| n38 | [−121] + Δ | [−118] + Δ | [−115] + Δ |
| n47 | [−117] + Δ | [−114] + Δ | [−111] + Δ |

In the example of Table 6, Δ is proposed to have a range of −3 to 3. It is proposed that the difference of the reception signal levels is 3 to 5 dB. For example, the difference between the PSSCH-RSRP value measured in operation band n47 and the PSSCH-RSRP value measured in operation band n38 may be 3 to 5 dB.

For example, Δ may be 0.5. In this case, for the operation band n38, in the case that the SCS is 15 kHz, the Minimum PSSCH-RSRP may be −120.5 dBm/SCS, in the case that the SCS is 30 kHz, the Minimum PSSCH-RSRP may be −117.5 dBm/SCS, and in the case that the SCS is 60 kHz, the Minimum PSSCH-RSRP may be −114.5 dBm/SCS. For the operation band n47, in the case that the SCS is 15 kHz, the Minimum PSSCH-RSRP may be −116.5 dBm/SCS, in the case that the SCS is 30 kHz, the Minimum PSSCH-RSRP may be −113.5 dBm/SCS, and in the case that the SCS is 60 kHz, the Minimum PSSCH-RSRP may be −110.5 dBm/SCS.

The example of Table 7 may represent Minimum Conditions for Absolute PSCCH-RSRP Accuracy Requirements. The minimum value of PSCCH-RSRP according to the example of Table 7 may be applied to the operation band n38 and the operation band n47. The example of Table 7, for example, may represent the Absolute PSCCH-RSRP Requirements for FR1.

TABLE 7

| NR V2X | Minimum PSSCH-RSRP dBm/SCS$_{PSSCH}$ | | |
|---|---|---|---|
| operating band groups | SCS$_{PSSCH}$ = 15 kHz | SCS$_{PSSCH}$ = 30 kHz | SCS$_{PSSCH}$ = 60 kHz |
| n38 | [−121] + Δ | [−118] + Δ | [−115] + Δ |
| n47 | [−117] + Δ | [−114] + Δ | [−111] + Δ |

In the example of Table 7, Δ is proposed to have a range of −3 to 3. It is proposed that the difference of the reception signal levels between n47 and n38 is 3 to 5 dB. For example, the difference between the PSCCH-RSRP value measured in the operation band n47 and the PSCCH-RSRP value measured in the operation band n38 may be 3 to 5 dB. For example, Δ may be 0.5. In this case, for the operation band n38, in the case that the SCS is 15 kHz, the Minimum PSCCH-RSRP may be −120.5 dBm/SCS, in the case that the SCS is 30 kHz, the Minimum PSCCH-RSRP may be −117.5 dBm/SCS, and in the case that the SCS is 60 kHz, the Minimum PSCCH-RSRP may be −114.5 dBm/SCS. For the operation band n47, in the case that the SCS is 15 kHz, the Minimum PSCCH-RSRP may be −116.5 dBm/SCS, in the case that the SCS is 30 kHz, the Minimum PSCCH-RSRP may be −113.5 dBm/SCS, and in the case that the SCS is 60 kHz, the Minimum PSCCH-RSRP may be −110.5 dBm/SCS.

In the disclosure of the present specification, the RSRP measurement requirement described referring to FIG. 9, FIG. 10, Table 6, and Table 7 may be referred to as the Intra-Frequency L1 SL-RSRP Measurement Accuracy Requirements. In addition, the RSRP measurement requirement described in the disclosure of the present specification may be applied to a UE performing the PSCCH-RSRP measurement and/or the PSSCH-RSRP measurement in the same frequency as the frequency used by the UE to perform V2Z sidelink communication. The RSRP measurement requirement described referring to FIG. 9, FIG. 10, Table 6, and Table 7 may be applied to the DMRS for PSCCH and/or the DMRS for PSSCH transmitted from one antenna port. In the RSRP measurement requirement describe referring to FIG. 9, FIG. 10, Table 6, and Table 7, the SNR may be described as Ês/Iot.

The drawings below are documented for the explanation of the specific example of the present specification. Since the name of the specific device or specific signal/message/field described in the drawing is exemplary presented, the technical features of the present specification are not limited to the specific name used in the drawing below.

Figure 11:
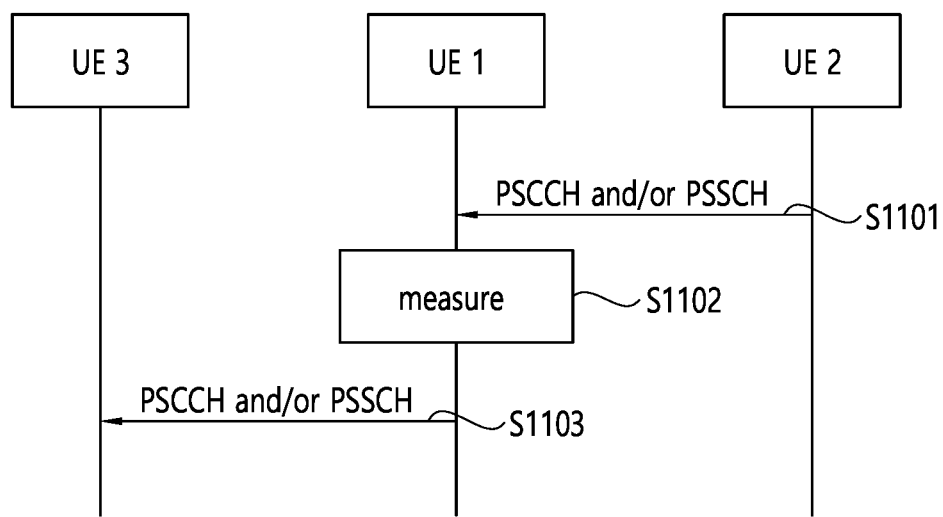
FIG. 11 illustrates an example of a UE operation according to a disclosure of the present specification.

FIG. 11 illustrates an example of a UE operation according to a disclosure of the present specification.

The operation of a UE illustrated in FIG. 11 is merely an example, and the scope of the disclosure of the present specification is not limited by the contents illustrated in FIG. 11. For example, a UE may perform the operation which is not shown in FIG. 11. In one example, a UE may perform the operation described in the examples of the various disclosures of the present specification described above.

In FIG. 11, UEs (e.g., UE 1, UE 2, and UE 3) are shown. The operation performed by the UE 1 may also be performed by the UE 2 or the UE 3. The operation performed by the UE 2 or the UE 3 may also be performed by the UE 1. The operation performed by the UE 2 may also be performed by the UE 3. The operation performed by the UE 3 may also be performed by the UE 2.

In step S1101, the UE 2 may transmit a PSCCH and/or a PSSCH to the UE 1. The UE 2 may transmit a DMRS to the UE 1 through a PSCCH and/or a PSSCH. The UE 1 may receive a DMRS from the UE 2. For example, the UE 1 may receive a PSCCH-DMRS (a DMRS transmitted through a PSCCH) and/or a PSSCH-DMRS.

In step S1102, the UE 1 may perform a measurement. For example, the UE 1 may perform a measurement based on the DMRS received from the UE 2. In one example, the UE 1 may measure the RSRP of the DMRS based on the RSRP measurement requirement. For example, the RSRP measurement requirement may include the requirement that the SNR of the DMRS needs to be 0 dB or greater. The RSRP measurement requirement may include the requirement that the RSRP accuracy is ±4.5 dB. Herein, the requirement that the RSRP accuracy is ±4.5 dB may imply that the RSRP measured by the UE 1 is measured within a value of a preset RSRP value (e.g., a minimum value of the RSRP) plus 4.5 dB or minus 4.5 dB. The RSRP measurement requirement may include the requirement that the measured RSRP needs to be a preset RSRP minimum value or greater.

In step S1103, the UE 1 may transmit an SL signal (e.g., SL related signal such as a PSCCH and/or a PSSCH) to the UE 3. For example, the UE may perform a measurement (e.g., RSRP measurement) based on the DMRS received from the UE 2, and check whether the UE 2 uses a resource in the resource pool allocated to the UE 1, and then, determine whether to transmit the SL signal by using the allocated resource pool. In one example, in the case that the UE 2 RSRP measurement value measured based on the RSRP measurement requirement is a preset threshold value or smaller, the UE 1 may transmit the SL signal to the UE 3 by using the resource pool allocated to the UE 1 itself.

For reference, step S1103 may be selectively performed. For example, in the example of FIG. 11, only steps S1101 and S1102 may be performed. Alternatively, in the example of FIG. 11, all steps S1101, S1102, and S1103 may be performed.

In the example of FIG. 11, the UE 1, the UE 2, and the UE 3 may perform sidelink communication by using the NR V2X operation band n38 or n47. For example, a transceiver of the UE 1, a transceiver of the UE 2, and a transceiver of the UE 3 may be configured to use the NR V2X operation band n38 or n47.

The preconfigured RSRP minimum value included in the RSRP measurement requirement may be based on the example of Table 6 and the example of Table 7 described above.

For example, in the case that the UE 1 uses the NR V2X operation band n38, the RSRP of the DMRS measured by the UE 1 may be the RSRP minimum value or greater as exemplified below. In the case that the SCS is 15 kHz, the minimum value of the preset RSRP may be −120.5 dBm, in the case that the SCS is 30 kHz, the minimum value of the preset RSRP may be −117.5 dBm, and in the case that the SCS is 60 kHz, the minimum value of the preset RSRP may be −114.5 dBm.

For example, in the case that the UE 1 uses the NR V2X operation band n47, the RSRP of the DMRS measured by the UE 1 may be the RSRP minimum value or greater as exemplified below. In the case that the SCS is 15 kHz, the minimum value of the preset RSRP may be −116.5 dBm, in the case that the SCS is 30 kHz, the minimum value of the preset RSRP may be −113.5 dBm, and in the case that the SCS is 60 kHz, the minimum value of the preset RSRP may be −110.5 dBm.

The UE 1 may check whether the UE 1 is able to receive a signal of another UE (e.g., UE 2) by performing the RSRP measurement. The case that the RSRP value of the UE 1 measured by the UE 1 is the preset minimum value of the RSRP may imply that the UE 1 may receive a signal sent by the UE 2.

The UE 1 may check whether another UE (e.g., UE 2) uses a resource in the resource pool allocated to the UE 1 itself by performing the RSRP measurement and determine whether to transmit the SL signal by using the allocated resource pool. For example, in step S1101, the UE 1 may measure the PSCCH RSRP and/or the PSSCH RSRP of the UE 2 in the resource pool allocated to the UE 1 itself. For example, in the case that the UE 1 is to communicate with another UE (e.g., UE 3) in the resource pool allocated to the UE 1 itself, the UE 1 may measure the RSRP of the DMRS (DMRS transmitted by the UE 2) received in the resource pool based on the RSRP measurement requirement. The case that the measured RSRP is a preset minimum value of the RSRP or greater means that the resource pool is used by the UE 2. In the case that the UE 1 transmits a signal using the resource pool, this may cause interference to the UE 2. Therefore, the UE 1 may exclude the resource pool from the resource pool allocated to the UE 1. In the case that the RSRP measured by the UE 2 is a preset minimum value of the RSRP or smaller, even in the case that the UE 2 uses the resource pool, in the case that the UE 1 perform transmission by using the resource pool, the interference exerted on the UE 2 may be small. In this case, the UE may transmit a signal using the resource pool and perform sidelink communication with another UE (e.g., UE 3).

According to the disclosure of the present specification, a UE may perform sidelink (or V2X) communication efficiently. For example, according to the disclosure of the present specification, the requirement for the RSRP measurement is clearly defined, and the UE may perform sidelink (or V2X) communication efficiently. Particularly, according to the disclosure of the present specification, the requirement related to the accuracy for a UE to measure the RSRP is clearly defined. According to the disclosure of the present specification, the side condition (e.g., SNR) for a UE to measure the RSRP is clearly defined. According to the disclosure of the present specification, the minimum value of the RSRP in the operation bands n38 and n47 are clearly defined.

For reference, the operation of the UE described in the present disclosure may be performed by the device shown in FIG. 1 to FIG. 3. For example, the UE may be the first wireless device 100 or the second wireless device 200 shown in FIG. 1. For example, the operation of the UE described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the UE described in the present disclosure by executing the instruction/program stored in the one or more memories 104 or 204.

Furthermore, the instructions for performing the operation of the UE described in the present disclosure may be stored in a non-volatile computer readable storage medium. The storage medium may be included in the one or more memories 104 or 204. In addition, the instructions stored in the storage medium may be executed by the one or more processors 102 or 202, and the operation of the UE described in the present disclosure may be performed.

For reference, the operation of the BS (e.g., NG-RAN, gNB, gNB (NB-IoT), gNB (NR) eNB, RAN, etc.) described in the present disclosure may be implemented by the device shown in FIG. 1 to FIG. 3. For example, the BS (e.g., NG-RAN, gNB, gNB (NB-IoT), gNB (NR) eNB, RAN, etc.) may be the first wireless device 100*a* or the second wireless device 100*b* shown in FIG. 1. For example, the operation of the BS (e.g., NG-RAN, gNB, gNB (NB-IoT), gNB (NR) eNB, RAN, etc.) described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the BS (e.g., NG-RAN, gNB, gNB (NB-IoT), gNB (NR) eNB, RAN, etc.) described in the present disclosure by executing the instruction/program stored in the one or more memories 104 or 204.

Furthermore, the instructions for performing the operation of the BS (e.g., NG-RAN, gNB, gNB (NB-IoT), gNB (NR) eNB, RAN, etc.) described in the present disclosure may be stored in a non-volatile (or non-transitory) computer readable storage medium. The storage medium may be included in the one or more memories 104 or 204. In addition, the instructions stored in the storage medium may be executed by the one or more processors 102 or 202, and the operation of the BS (e.g., NG-RAN, gNB, gNB (NB-IoT), gNB (NR) eNB, RAN, etc.) described in the present disclosure may be performed.

So far, the preferred embodiment has been described in an exemplary manner. However, the disclosure of the present specification is not limited to the specific embodiment and may be modified, altered, or improved in various forms within the inventive concept and the scope written in the claims of the present disclosure.

In the exemplary system described above, the methods are described based on a flowchart as a series of steps or blocks. However, the methods are not limited to the order of the steps described above, and a certain step may be performed in a different order or performed simultaneously. Furthermore, it is understood that the steps shown in the flowchart are not mutually exclusive, but another step may be included, or one or more steps may be deleted without influencing the scope to those ordinary skilled in the art.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A User Equipment (UE) for performing sidelink communication, the UE comprising:
   at least one transceiver;
   at least one processor; and
   at least one computer memory operably connected to the at least one processor and storing instructions that, based on being executed by the at least one processor, perform operations comprising:
   receiving Demodulation Reference signal (DMRS) via Physical Sidelink Shared Channel (PSSCH) or Physical Sidelink Control Channel (PSCCH) from other UE; and
   measuring Reference Signal Received Power (RSRP) of the DMRS based on RSRP measurement requirements,
   wherein the RSRP measurement requirements includes a requirement that signal-to-noise ratio (SNR) of the DMRS is equal to or bigger than zero decibels (0 dB) and requirement that an accuracy of the measured RSRP is ±4.5 dB.

2. The UE of claim 1, wherein, the RSRP is measured to be equal to or bigger than a minimum RSRP value, based on that the at least one transceiver use New Radio (NR) Vehicle-to-Everything (V2X) operating band n38 for the sidelink communication.

3. The UE of claim 2, wherein the minimum RSRP value is equal to −120.5 decibel-milliwatts (dBm), based on that a subcarrier spacing (SCS) is 15 kilohertz (kHz), wherein the minimum RSRP value is equal to −117.5 dBm, based on that the SCS is 30 kHz, and wherein the minimum RSRP value is equal to −114.5 dBm, based on that the SCS is 60 kHz.

4. The UE of claim 1, wherein, the RSRP is measured to be equal to or bigger than a minimum RSRP value, based on that the at least one transceiver use NR V2X operating band n47 for the sidelink communication.

5. The UE of claim 4, wherein, wherein the minimum RSRP value is equal to −116.5 dBm, based on that a SCS is 15 kHz, wherein the minimum RSRP value is equal to −113.5 dBm, based on that the SCS is 30 kHz, and wherein the minimum RSRP value is equal to −110.5 dBm, based on that the SCS is 60 kHz.

6. The UE of claim 1, wherein the UE is an autonomous driving device configured to communicate with at least one of a mobile terminal, a network, and another autonomous vehicle other than the UE.

7. A method of performing sidelink communication by a user equipment (UE), the method comprising:
   receiving Demodulation Reference signal (DMRS) via Physical Sidelink Shared Channel (PSSCH) or Physical Sidelink Control Channel (PSCCH) from other UE; and
   measuring Reference Signal Received Power (RSRP) of the DMRS based on RSRP measurement requirements,
   wherein the RSRP measurement requirements includes a requirement that signal-to-noise ratio (SNR) of the DMRS is equal to or bigger than zero decibels (0 dB) and requirement that an accuracy of the measured RSRP is ±4.5 dB.

8. The method of claim 7, wherein, the RSRP is measured to be equal to or bigger than a minimum RSRP value, based on that the at least one transceiver use New Radio (NR) Vehicle-to-Everything (V2X) operating band n38 for the sidelink communication.

9. The method of claim 8, wherein, wherein the minimum RSRP value is equal to −120.5 decibel-milliwatts (dBm), based on that a subcarrier spacing (SCS) is 15 kilohertz (kHz), wherein the minimum RSRP value is equal to −117.5 dBm, based on that the SCS is 30 kHz, and wherein the minimum RSRP value is equal to −114.5 dBm, based on that the SCS is 60 kHz.

10. The method of claim 7, wherein, the RSRP is measured to be equal to or bigger than a minimum RSRP value, based on that the at least one transceiver use NR V2X operating band n47 for the sidelink communication.

11. The method of claim 10, wherein, wherein the minimum RSRP value is equal to −116.5 dBm, based on that a SCS is 15 kHz, wherein the minimum RSRP value is equal to −113.5 dBm, based on that the SCS is 30 kHz, and wherein the minimum RSRP value is equal to −110.5 dBm, based on that the SCS is 60 kHz.

12. An apparatus for mobile communication, comprising:
at least one processor; and
at least one memory configured to store instructions and electrically connectable to the at least one processor operably,
wherein an operation performed based on the instructions executed by the at least one processor includes:
obtaining a Demodulation Reference signal (DMRS) via Physical Sidelink Shared Channel (PSSCH) or Physical Sidelink Control Channel (PSCCH) from another apparatus; and
measuring a Reference Signal Received Power (RSRP) of the DMRS based on RSRP measurement requirements,
wherein the RSRP measurement requirements includes a requirement that signal-to-noise ratio (SNR) of the DMRS is equal to or bigger than zero decibels (0 dB) and requirement that an accuracy of the measured RSRP is ±4.5 dB.

* * * * *